(12) United States Patent
Ghosh et al.

(10) Patent No.: US 11,410,414 B2
(45) Date of Patent: Aug. 9, 2022

(54) SYSTEMS AND METHODS FOR DETECTION AND LOCALIZATION OF IMAGE AND DOCUMENT FORGERY

(71) Applicant: Insurance Services Office Inc., Jersey City, NJ (US)

(72) Inventors: Anurag Ghosh, Chhattisgarh (IN); Dongmian Zou, Jiangsu Province (CN); Maneesh Kumar Singh, Princeton, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 15/729,413

(22) Filed: Oct. 10, 2017

(65) Prior Publication Data
US 2018/0101751 A1 Apr. 12, 2018

Related U.S. Application Data (60) Provisional application No. 62/406,687, filed on Oct. 11, 2016, provisional application No. 62/406,280, filed on Oct. 10, 2016.

(51) Int. Cl.
*G06V 10/75* (2022.01)
*G06F 16/583* (2019.01)
(Continued)

(52) U.S. Cl.
CPC ........ *G06V 10/758* (2022.01); *G06F 16/5838* (2019.01); *G06K 9/6274* (2013.01);
(Continued)

(58) Field of Classification Search
CPC .. G06K 9/6212; G06K 9/6274; G06K 9/6277; G06K 9/66; G06F 16/5838; G06N 3/04; G06N 3/08; G06Q 50/26
See application file for complete search history.

(56) References Cited

U.S. PATENT DOCUMENTS 8,023,747 B2 9/2011 Shi et al.
8,848,984 B2 9/2014 Yager et al.
(Continued)

OTHER PUBLICATIONS

Masmoudi et al., "A Novel Fingervein Recognition System Based on Monogenic Local Binary Pattern Features," IJET, vol. 5—No. 6 (Year: 2013).*

(Continued)

*Primary Examiner* — John W Lee
(74) *Attorney, Agent, or Firm* — McCarter & English, LLP (57) ABSTRACT

Systems and methods for detection and localization of image and document forgery. The method can include the step of receiving a dataset having a plurality of authentic images and a plurality of manipulated images. The method can also include the step of benchmarking a plurality of image forgery algorithms using the dataset. The method can further include the step of generating a plurality of receiver operating characteristic (ROC) curves for each of the plurality of image forgery algorithms. The method also includes the step of calculating a plurality of area under curve metrics for each of the plurality of ROC curves. The method further includes the step of training a neural network for image forgery based on the plurality of area under curve metrics.

34 Claims, 5 Drawing Sheets

(51) Int. Cl.
| | |
|---|---|
| G06K 9/62 | (2022.01) |
| G06N 3/04 | (2006.01) |
| G06N 3/08 | (2006.01) |
| G06V 30/194 | (2022.01) |
| G06Q 50/26 | (2012.01) |
| G06V 10/82 | (2022.01) |

(52) U.S. Cl.
CPC ............ *G06K 9/6277* (2013.01); *G06N 3/04* (2013.01); *G06N 3/08* (2013.01); *G06V 30/194* (2022.01); *G06Q 50/26* (2013.01)

(56) References Cited

U.S. PATENT DOCUMENTS

| | | | | |
|---|---|---|---|---|
| 2004/0013303 | A1* | 1/2004 | Lienhart | G06V 40/172 382/224 |
| 2008/0193031 | A1* | 8/2008 | Shi | G06T 1/0028 382/250 |
| 2012/0218284 | A1* | 8/2012 | Yager | G09G 5/003 345/589 |
| 2012/0230536 | A1* | 9/2012 | Fridrich | G06V 10/30 382/100 |
| 2017/0343481 | A1* | 11/2017 | Jahanshahi | G06N 3/0454 |

OTHER PUBLICATIONS

Shivakumar et al., "Detection of Region Duplication Forgery in Digital Images Using SURF," International Journal of Computer Sciences Issues, vol. 8 (Year: 2011).*
Khanna et al., "Forensic Techniques for Classifying Scanner, Computer Generated and Digital Camera Images," IEEE (Year: 2008).*
Berg et al., "Searching for Hidden Messages: Automatic Detection of Steganography," AAAI (Year: 2003).*
Hill et al., "Evaluating the Fusion of Multiple Classifiers via ROC curves," Aug. 25, 2003, SPIE, pp. 411-422 (Year: 2003).*
International Search Report of the International Searching Authority dated Dec. 14, 2017, issued in connection with International Application No. PCT/US2017/055899 (4 pages).
Written Opinion of the International Searching Authority dated Dec. 14, 2017, issued in connection with International Application No. PCT/US2017/055899 (9 pages).
Masmoudi, et al., "A Novel Fingervein Recognition System Based on Monogeneic Local Binary Pattern Features," International Journal of Engineering and Technology, vol. 5, No. 6, 2013 (8 pages).
Shivakumar, et al., "Detection of Region Duplication Forgery in Digital Images Using SURF," International Journal of Computer Science Issues, vol. 8, Issue 4, Jul. 2011 (7 pages).
Khanna, et al., "Forensic Techniques for Classifying Scanner, Computer Generated and Digital Camera Images," In Acoustics, Speech and Signal Processing, IEEE International Conference, Mar. 31, 2008 (5 pages).
Berg, et al., "Searching for Hidden Messages: Automatic Detection of Steganography," IAAI, Aug. 2003 (7 pages).
Fontani,, et al., "The Watchful Forensic Analysist: Multi-Clue Information Fusion with Background Knowledge," 2013 IEE International Workshop on Information Forensics and Security, Nov. 18, 2013 (6 pages).
European Search Report dated Mar. 5, 2020, issued in connection with European Patent Application No. 17861102.6 (10 pages).
Qu, et al., "A Convolutive Mixing Model for Shifted Double JPEG Compression with Application to Passive Image Authentication," IEEE, 2008 (4 pages).
Mankar, et al., "Image Forgery Types and Their Detection: A Review," International Joural of Advanced Research in Computer Science and Software Engineering, vol. 5, Issue 4, Apr. 2015 (5 pages).
Kumar, "Image Forgery Detection Using Median Filtering Based on Convolutional Neural Networks," International Journal of Advanced Research in Biology Engeinnering Science and Technology, vol. 2, Issue 6, Jun. 2016 (7 pages).

Sahani, et al., "Image Forgery Detectionn Using Svm Classifier," International Journal of Advanced Research in Electrical, Electronics and Instrumentation Engineering, vol. 3, Issue 3, Mar. 2014 (6 pages).
Hashmi, et al., "Robust Image Authentication Based on HMM and SVM Classifiers," Engineering Letters, Nov. 30, 2014 (11 pages).
Thakur, et al., "Image Forgery Detection Using SIFI and PCA Classifiers for Panchromatic Images," International Journal of Science Technology and Engineering, vol. 3, Issue 1, Jul. 2016 (6 pages).
Birajdar, et al., "Digital Image Forgery Detection Using Passive Techniques: A Survey," Digital Investigation, vol. 10, No. 3, pp. 226-245, 2013 (20 pages).
Farid, "Image Forgery Detection—A Survey," IEEE Signal Processing Magazine, Mar. 2009 (10 pages).
Rocha, et al., "Vision of the Unseen: Current Trends and Challenges in Digital Image and Video Forensics," ACM Computing Surveys, vol. 43, No. 4, Article 26, Oct. 2011 (42 pages).
Christlein, et al., "An Evaluation of Popular Copy-Move Forgery Detection Approaches," IEEE Transactions on Information Forensics and Security, vol. 7, No. 6, pp. 1841-1854, Dec. 2012 (14 pages).
Sarkar, et al., "Detection of Seam Carving and Localization of Seam Insertions in Digital Images," in Proceedings of the 11th ACM workshop on Multimedia and Security, Sep. 2009, pp. 107-116 (10 pages).
Lin, et al., "Fast, Automatic and Fine-Grained Tampered JPEG Image Detection via DCT Coefficient Analysis," Pattern Recognition, vol. 42, No. 11, pp. 2492-2501, 2009 (10 pages).
Bianchi, et al., "Improved DCT Coefficient Analysis for Forgery Localization in JPEG Images," 2011 IEEE International Conference on Acoustics, Speech and Signal Processing (ICASSP), pp. 2444-2447 (4 pages).
Amerini, et al., "Splicing Forgeries Localization Through the Use of First Digit Features," 2014 IEEE International Workshop on Information Forensics and Security, pp. 43-148 (6 pages).
Bianchi, et al., "Detection of Nonaligned Double JPEG Compression Based on Integer Periodicity Maps," IEEE Transactions on Information Forensics and Security, vol. 7, No. 2, pp. 842-848, Apr. 2012 (7 pages).
Bianchi, et al., "Image Forgery Localization via Block-Grained Analysis of JPEG Artifacts," IEEE Transactions on Information Forensics and Security, vol. 7, No. 3, pp. 1003-1017, Jun. 2012 (15 pages).
Krawets, "A Picture's Worth: Digital Image Analysis and Forensics," 2007 (31 pages).
Farid, "Exposing Digital Forgeries from JPEG Ghosts," IEEE Transactions on Information Forensics and Security, vol. 4, No. 1, pp. 154-160, Mar. 2009 (7 pages).
Wang, et al., Tampered Region Localization of Digital Color Images Based on JPEG Compression Noise, in Digital Watermarking, Springer, 2010, pp. 120-133 (14 pages).
Li, et al., "Passive Detection of Doctored JPEG Image via Block Artifact Grid Extraction," Signal Processing, vol. 89, No. 9, pp. 1821-1829, 2009 (9 pages).
Ye, et al., "Detecting Digital Image Forgeries by Measuring Inconsistencies of Blocking Artifact," 2007 IEEE International Conference on Multimedia and Expo, pp. 12-15 (4 pages).
Ferrara, et al., "Image Forgery Localization via Fine-Grained Analysis of CFA Artifacts," IEEE Transactions on Information Forensics and Security, vol. 7, No. 5, pp. 1566-1577, Oct. 2012 (12 pages).
Dirik, et al., "Image Tamper Detection Based on Demosaicing Artifacts," 2009 16th IEEE International Conference on in Image Processing (ICIP), pp. 1497-1500 (4 pages).
Yerushalmy, et al., "Digital Image Forgery Detection Based on Lens and Sensor Aberration," International Journal of Computer Vision, vol. 92, (2011) pp. 71-91 (21 pages).
Mahdian, et al., "Using Noise Inconsistencies for Blind Image Forensics," Image and Vision Computing, vol. 27, (2009), pp. 1497-1503 (7 pages).
Lyu, et al., "Exposing Region Splicing Forgeries with Blind Local Noise Estimation," International Journal of Computer Vision, vol. 110 (2014), pp. 202-221 (20 pages).

(56) References Cited

OTHER PUBLICATIONS

Zampoglou, et al., "Web and Social Media Image Forensics for News Professionals," The Workshops of the Tenth International AAAI Conference on Web and Social Media Social Media in the Newsroom (2016) (8 pages).

Cattaneo, et al., "A Possible Pitfail in the Experimental Analysis of Tampering Detection Algorithms," 2014 International Conference on Network-Based Information Systems, IEEE (2014), pp. 279-286 (8 pages).

Amerini, et al., "A Sift-Based Forensic Method for Copy-Move Attack Detection and Transformation Recovery," IEEE Transactions on Information Forensics and Security, vol. 6, No. 3, pp. 1099-1110, Sep. 2011 (12 pages).

Gloe, et al., "The Dresden Image Database for Benchmarking Digital Image Forensics," Journal of Digital Forensic Practice, vol. 3, (2010) pp. 150-159 (11 pages).

Hsu, et al., "Detecting Image Splicing Using Geometry Invariants and Camera Characteristics Consistency," in International Conference on Multimedia and Expo, 2006 (4 pages).

Dang-Nguyen, et al., "Raise: A Raw Images Dataset for Digital Image Forensics," in Proceedings of the 6th ACM Multimedia Systems Conference, ACM, (2015) pp. 219-224 (6 pages).

Schaefer, et al., "UCID: An Uncompressed Colour Image Database," Proceedings of SPIE Electronic Imaging, SPIE vol. 5307 (2004) (10 pages).

Fontani, et al., "A Framework for Decision Fusion in Image Forensics Based on Dempster-Shafer Theory of Evidence," IEEE Transactions on Information Forensics and Security, vol. 8, No. 4, pp. 593-607, Apr. 2013 (15 pages).

Kingma, et al., "Adam: A Method for Stochastic Optimization," (2014) (9 pages).

CASIA Tampered Image Detection Evaluation Database, http://forensics.idealtest.org—Internet Wayback Machine screen capture of website dated Feb. 22, 2012 (1 page).

Dong, et al., "Casia Image Tampering Detection Evaluation Database," Institute of Automation, Chinese Academy of Sciences, IEEE 2013 (5 pages).

Communication Pursuant to Article 94(3) EPC dated Nov. 16, 2021, issued by the European Patent Office in connection with European Patent Application No. 17861102.6 (9 pages).

Provost, et al., "Robust Classification for Imprecise Environments," Cornell University Library, arXiv:cs/0009007v1, Sep. 13, 2000 (24 pages).

\* cited by examiner

FIG. 1

| Algorithm | Accuracy (NN) | Accuracy (ROC) |
|---|---|---|
| ADQ1 | 0.7853 | 0.8113 |
| ADQ2 | 0.6532 | 0.7317 |
| ADQ3 | 0.7356 | 0.6574 |
| BLK | 0.8390 | 0.5960 |
| BLK2 | 0.5000 | 0.7985 |
| CFA1 | 0.5000 | 0.6251 |
| CFA2 | 0.6313 | 0.5684 |
| DCT | 0.5000 | 0.6322 |
| ELA | 0.5332 | 0.8018 |
| GHO | 0.5000 | 0.6406 |
| NADQ | 0.8070 | 0.6174 |
| NOI1 | 0.5000 | 0.5498 |
| NOI2 | 0.5000 | 0.5172 |
| Fusion | 0.9402 | 0.8113 |

SYSTEMS AND METHODS FOR DETECTION AND LOCALIZATION OF IMAGE AND DOCUMENT FORGERY

RELATED APPLICATIONS

This application claims priority to U.S. Provisional Patent Application Ser. No. 62/406,280 filed on Oct. 10, 2016 and U.S. Provisional Patent Application Ser. No. 62/406,687 filed on Oct. 11, 2016, the entire disclosures of which are both hereby expressly incorporated by reference.

BACKGROUND

Field of the Disclosure

The present disclosure relates to computer vision systems and methods for image analysis. In particular, the present disclosure relates to systems and methods for detection and localization of image and document forgery.

RELATED ART

Images can be manipulated in various ways. Various touchups and image manipulation techniques are applied to augment or enhance the image. For instance, applications such as Instagram are very popular where users apply "filters" to improve the look of their images. Images are regularly resized and recompressed, so that they can be more easily exchanged over the internet due to the proliferation of cloud-based photo sharing and editing websites like Flickr and Picasa, spurred by social media applications like WhatsApp, Instagram, and Snapchat. These manipulations may not be categorized as image tampering as the intent to manipulate information content of an image is minimal. However, the advent of image processing software and toolboxes, such as Photoshop and GIMP, provide tools to easily manipulate images for nefarious purposes, in addition to legitimate purposes.

It is important to be able to distinguish between image enhancements from image tampering. Image enhancement mostly do not involve local manipulations (notable exception would include Bilateral Filtering for touchups) while tampering at times involves local manipulations. For instance, contrast and brightness adjustments are some operations which are normally not useful per se for image tampering, whereas sharpening and blurring operations may aid in image tampering to some extent and copy-move, splicing operations make up the nefarious end of the spectrum. Further, malicious intent varies with each case. For example, a bank which allows photo-based check transactions by accepting customer check images would accept manipulations caused by the process of sending those images, such as quality reduction from compression. However, the manipulation of digits written in the image would be catastrophic and must be detected. In another instance, a cosmetics advertisement involving photos of models usually contain various manipulations and touch-ups, which may be considered malicious from a consumer's perspective.

Manipulating images and documents with nefarious intent through insidious means makes it important to detect such instances of tampering with reasonable accuracy and confidence. Image forensics is the name given for the detection of harmful manipulations. An image forensics algorithm can output a signal classification result as for whether the image has been tampered, as well as identify the portions of the image that are tampered, that is, localize the tampered regions of an image. Such manipulations are normally countered and detected through active image tampering detection techniques. Active techniques involves embedding a watermark to an image when it's taken and authenticating the image by checking the watermark. These techniques require sophisticated hardware and are very expensive.

Manipulations can also be detected through passive techniques. Passive methods do not depend on a watermark for authenticity. Rather, passive methods aim to determine the integrity of the image without any extra information. The notion of "blindness" in terms of techniques conveys that image semantics are not taken into account while identifying image forgery. Although tampering techniques may not have visibly manipulated the image, they commonly leave some traces of the manipulation in terms of changes in image statistics, artifacts and inconsistencies. These inconsistencies are exploited to identify if an image has been tampered and localize the tampered region of the image. The issue with passive detection algorithms is that they focus only on detecting a single type of image manipulation and could allow other image manipulations to go undetected. These algorithms are also not accurate enough.

Therefore, there exists a need for systems and methods for detection and localization of image and document forgery which address the foregoing needs.

SUMMARY

Systems and methods for detection and localization of image and document forgery are provided. The method can include the step of receiving a dataset having a plurality of authentic images and a plurality of manipulated images. The method can also include the step of benchmarking a plurality of image forgery algorithms using the dataset. The method can further include the step of generating a plurality of receiver operating characteristic (ROC) curves for each of the plurality of image forgery algorithms. The method also includes the step of calculating a plurality of area under curve metrics for each of the plurality of ROC curves. The method further includes the step of training a neural network for image forgery based on the plurality of area under curve metrics.

A non-transitory computer-readable medium having computer-readable instructions stored thereon is also provided. When the instructed are executed by a computer system, it can cause the computer system to perform a number of steps. One step can include receiving a dataset having a plurality of authentic images and a plurality of manipulated images. Another step can include benchmarking a plurality of image forgery algorithms using the dataset. Another step can include generating a plurality of receiver operating characteristic (ROC) curves for each of the plurality of image forgery algorithms. Another step can include calculating a plurality of area under curve metrics for each of the plurality of ROC curves. Another step can include training a neural network for image forgery based on the plurality of area under curve metrics.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to systems and methods for detection and localization of image and document forgery, as discussed in detail below in connection with FIGS. 1-5.

Before describing the systems and methods of the present disclosure in detail, it is noted that numerous types of forgeries can be detected, as described below.

Malicious image manipulation is typically done by applying local manipulations. Localizing these manipulations provides a forensics expert with insight and a degree of confidence about the nature and extent of the tampering. An example of malicious image manipulation is image splicing. Image splicing can be where two or more images are spliced together, normally to create an impression that a foreground object is part of the background taken from the other image. This may involve blurring and other kinds of additional touch-ups to make the image look authentic. This can be used by well trained forgery experts to tamper documents where letters or whole words may be removed or manipulated, changing the entire meaning of the document. Another instance would be moving a person beside another in an unlikely image, say a politician beside a terrorist to create a rumor.

Copy-moving is another kind of alteration where parts of the same image are used to retouch the image or hide objects (such as changing a crime scene photograph). Other techniques, such as seam carving are also used to remove objects from images and can be detected.

Rendered imagery due to advances in computer graphics are at times photo-realistic and thus indistinguishable to the naked eye. However, because may not acquired from a digital device, it's seen that they can be distinguished from natural images through differences in noise residuals and artifacts that arise from the camera acquisition process.

Steganography is another field of manipulation which attempts to convey hidden messages by hiding information in cover images without affecting the covers statistical properties, which would otherwise be used for detection.

The image forgery detection system of the present disclosure can concentrate on various image statistics that can be used to discern non-tampered regions from tampered regions. The system of the present disclosure can also exploit the artifacts and inconsistencies that are created due to JPEG compression, which is widely used as an image format. The system can also exploit the inherent noise present in the image due to difference in Color Filter array interpolation in different cameras or inconsistencies in the local noise pattern caused due to splicing. The system can also analyze the lighting inconsistency. The system can function without analyzing the content of an image.

JPEG images can be compressed according to 8×8 Discrete Cosine Transform (DCT) blocks. The system of the present disclosure can use this fact to detect tampering operations under various principles. JPEG images which are tampered can suffer from a double phenomenon known as double compression, with inconsistencies between DCT histograms of singly and doubly compressed regions. DCT coefficients of unmodified areas can undergo a double JPEG compression thus exhibiting double quantization (DQ) artifacts, while DCT coefficients of tampered areas will result from a single compression and could present no artifacts. The system can identify tampered blocks by considering DCT coefficients and computing a likelihood map indicating the probability for each 8×8 DCT block of being double compressed. Low frequency coefficients within each block can be used in practice to determine the probability that a block is tampered assuming that the DCT coefficients within a block are mutually independent. The likelihoods can be computed based on a Bayesian approach according to the evaluated periodicity of the DCT coefficient histograms. The difference lies in the choice of assumed distribution. Further, the system can identify double JPEG artifacts, including but not limited to A-DJPG and NA-DJPG artifacts. This could depend on whether the second JPEG compression adopts a discrete cosine transform (DCT) grid aligned with the one used by the first compression or not. The system can also identify a specialized feature set to classify blocks using SVM as being double compressed or not. DCT coefficients of single quantized images can follow Benford's distribution, while it may not for double quantized images. The system can address images in the JPEG2000 format and can work where the second quantization factor is small. The system can detect splicing, inpainting, cropping, shifting and other forgery methods. The system can separate two conditional probabilities in making its determinations. Moreover, the system can have direct probabilistic interpretation. For non-aligned double JPEG compression (grid shifted tampering), the system can also employ a threshold based detector. The system can also employ a threshold based detector for other situations. Furthermore, for double JPEG compression, the system can generate a likelihood map for tampering.

Error level analysis is another way in which the system can detect image forgery. Error level analysis can intentionally resave a JPEG image at a known error rate and then compute the difference between the resaved image and the image which is being detected for image forgery. Any modification to the image can alter the image such that stable areas can become unstable. Differently compressed versions of the image can be compared with the possibly tampered image. When the same quality factor of the tampered area is adopted, a spatial local minima, christened as JPEG ghosts can appear and can be used to discern tampered regions. The system can extend the analysis by extracting the high frequency noise from a noise map using Principal Component Analysis and then characterizing the tampered region based on the high frequency noise. The system can also address situations of splicing and inpainting for error level analysis.

For manipulated images, when the tampered part is pasted into the background image, the DCT blocks might not match and some block artifacts might be left. The system can use a second order difference of pixel values to extract block artifact grids and can then automatically identify regions which are likely to be tampered. The system can use DCT coefficients to estimate the block artifacts. The system can also estimate the DCT quantization table and then check the uniformity of the quantization remainders. The system can address splicing, inpainting, cropping and copy-move.

Image features like local noise or camera noise arising from an image acquisition process or due to manufacturing or hardware characteristics of a digital camera can provide sufficient information to determine an image's authenticity since they can be sensitive to image manipulation as well as being difficult to forge synthetically. The system can leverage the fact that image regions of different origins may have different noise characteristics introduced by the sensors or post-processing steps of their original source. During image acquisition, every pixel can receive only a single color-channel value (red, green or blue). To produce the final image, the raw data can undergo an interpolation process, using Color Filter Array (CFA) to obtain a color image with different cameras using slightly different parameters to perform the interpolation. The system can exploit the artifacts created by Color Filter Array processing in most digital cameras. The system can estimate CFA interpolation pattern and CFA based noise analysis as features and train a classifier based on these features. This process can be applied to images other than those saved in JPEG format. Because tampering can alter artifacts due to demosaicking algorithms, the system can provide a tampering probability of a 2×2 block with a very fine grained likelihood map. Moreover, the system can employ a simple thresholding classifier.

The system can also include a tamper identification method based on the effects introduced in the acquired image by the optical and sensing systems of the camera. The system can identify local artifacts arising from chromatic-aberration (Purple Fringing Aberration or PFA) due to image acquisition procedure of a camera lens. The geometric center of the image can be inducted from the PFA events. For localization, the PFA "normal flows" can be used to detect tampered areas. The system can handle cropped images because of, in part, inconsistencies in chromatic aberration artifacts (Purple Fringing).

The system can estimate noise levels of blocks from a sub-band generated from a one level wavelet transform and then label and merge blocks by thresholding the difference of the estimated noise levels. The noise levels are estimated by a median based estimator. The system can exploit a regular property of Kurtosis of images in band pass space to estimate noise characteristics. The noise statistics estimation can be formulated as an optimization problem with a closed-form solution, which can be used to estimate local noise statistics to discern between tampered regions of an image. The system can also address segmentation based on noise level obtained from a Wavlet transform. The system can be efficient and complementary to JPEG artifacts at high quality levels.

Datasets which can be used for testing and/or implementing the system of the present disclosure will now be discussed. It should be noted that the present disclosure is not limited to these datasets and can include any datasets that are consistent with the spirit of the present disclosure. CASIA Image Tampering Detection Evaluation Database is a widely used standard dataset for evaluating forgery detection. It includes uncompressed images with various resolution as well as JPEG images with different compression quality factors. The images involve splicing (with arbitrary contour) and also post-processing (blurring and filtering). MICC Image Databases is a dataset which is aimed at copy move forgery detection and localization. The databases can be further divided into there datasets: F2000, F600, F220, which all contain high resolution images. In each of these datasets, around half of the images are tampered. The F600 provides ground truth masks for the tampered images. The type of processing on the copy-move forgeries can relate to rotation and scaling. Dresden Image Database is constructed with the aim of evaluating and developing methods for detecting image tampering as well as identifying the type of device for the acquisition of an image. It contains images taken using 73 digital cameras in 25 different models. They use various camera settings when the authors take the pictures. Columbia Uncompressed Image Splicing Detection Evaluation Dataset provides tampered and original images with image splicing without various post processing techniques applied. It also provides edge ground truth masks for evaluation of the localization of the tampered images. RAISE Raw Image Dataset includes 8156 high resolution uncompressed images. The images contain various categories, including outdoor images, indoor images, Landscape and Nature scenes along with People, Objects and Buildings. They have also provided smaller subsets, RAISE-1k, RAISE-2k, RAISE-4k and RAISE-6k. Uncompressed Colour Image Database was originally a benchmark dataset for image retrieval with the goal of understanding the effects of compression on content based image retrieval (CBIR).

The system can include a dataset which is a combination of the above datasets. The Dresden uncompressed image dataset and the RAISE image dataset, as noted above, have a relatively larger number of raw images of high resolution and thus are a good source for carrying out operations such as splicing and copy-moving. The system can cut a rectangular part of size 720-by-600 as the "authentic image." The system can build an image forgery simulation system which take input raw images and automatically generates "tampered images" and produces ground truth masks as well. Although it might be easy for a human to distinguish a "tampered" image from an "authentic" one, the difficulty does not impact the machine learning aspect of the present disclosure. Specifically, the "tampered" images used in can be spliced. For splicing, the system can randomly pick one JPEG image and one uncompressed (TIFF) image from the authentic images. A polygonal part can be taken from the TIFF image and used to replace part from the JPEG image. Then the system can filter the image with Gaussian processes and save the image as a compressed JPEG file. The simulation system is capable of handling other types of tampering operation as well. For copy-move, the system can take an authentic image from the dataset and copy a polygonal part and paste it to another region on the same image. The same post-processing can be done for splicing. The benchmarking tasks as will be discussed in greater detail blow can be done with 20000 authentic images and 20000 tampered images (thus 40000 in total). The algorithms to be benchmarked all work for splicing and thus the system use spliced images. The same set of images can be used for fusion as will be discussed in greater detail below. For fusion, 40000 images can be further split into 29980 training images and 9990 testing images.

Benchmarks will now be discussed in greater detail. The system of the present disclosure can use the various algorithms for detecting image forgery described in greater detail above and perform a benchmarking using authentic images and spliced images as described above. The system can collect the results both for the classification (i.e. whether an image has been tampered) and localization/detection (i.e. which part of an image has been tampered). The system can perform a Kolmogorov-Smirnov test and compare the statistics of the tampered region and the untampered region. The system can then put a threshold on that difference and draw an ROC curve. The system can use two benchmark processes for classification and localization as will be discussed in greater detail below. Additional benchmark processes can be used within the scope of the present disclosure.

The expected output of a classification algorithm is a single value. The expected output of a localization algorithm is normally a likelihood map of pixels or blocks. The system can rely on both types of data. If the result does not contain a classification result, the system can use a uniform decision rule and compare the performance.

From a classification perspective, the system can compute the true positive (TP) and false positive (FP) rates because the output is binary. For a localization algorithm, the system can first resize the output likelihood map and the ground truth to the same dimension, say m-by-n. Let $p(x, y)$ denote the $(x,y)$-pixel value of an images where $1<x<m$, and $1<y<n$. Then the value of the pixels, $p(x, y)$ are normalized to be in the range [0, 1]. A threshold h can be introduced to distinguish "tampered" and "untampered" pixels. In particular, the system can generate a binary decision map P with $P(x, y)=1$ if $p(x, y)>h$ and $P(x, y)=0$, where 1 means "tampered" and 0 means "untampered." Also, the system can denote the ground truth mask by $N(x, y)$. The system can count the number of pixels $N_1=|\{(x, y):N(x,y)=P(x, y)=1\}|$, $N_2=|\{(x, y):N(x,y)=1, P(x, y)=0\}|$, $N_3=|\{(x, y):N(x,y)=0, P(x, y)=1\}|$, $N_4=|\{(x, y):N(x,y)=0, P(x, y)=0\}|$. Consequently, the system can compute the intersection-over-union (IOU) metric, which can be $IOU=N_1/(N_1+N_2+N_3)$. The system can use another threshold h' for IOU. In particular, for an image, the output can be 1 if IOU>h' and 0 if otherwise, where 1 means "detect" and 0 means "not detected." Then the system can compute the TP and FP rates according to the respective number of images. For a fixed h', the system can adjust h, to obtain a series of pairs of TP-FP rates. The system can plot them and connect to draw an ROC curve. In this case, if the system takes a number of values for h, the system will generate a plurality of ROC curves.

Each TP-FP plot corresponds to a threshold, and thus a decision rule. Therefore, each point on a line segment connecting any two plots corresponds to an available decision rule. Therefore, the system can consider the convex hull of an ROC curve. Where the system includes both h and h' the system can consider the convex hull of all the curves. A larger area under a curve (AUC) could imply a preference for the corresponding algorithm.

If the system is only provided with the likelihood maps, the system can utilize an automatic decision rule. In particular, the system can count the number of tampered pixels. In this case, the system can use h to distinguish "tampered" and "untampered" pixels, as discussed above. The system can then count the number n of pixels with $p(x, y)=1$. The output can be tampered if n>h', and untampered if otherwise. For fixed h' the system can draw an ROC curve for h, and then obtain a number of curves by adjusting h.

Alternatively, or additionally, the system can draw ROC curves based on the "area" of a correctly detected region. The system can count the number of pixels and use threshold h to distinguish "tampered" and "untampered" pixels. The system can then count the total number of pixels over all the images. As discussed in greater detail above, the system can calculate, $N_1, \ldots, N_4$. The average TP rate can be defined as $N_1/(N_1+N_3)$, and the average FP rate can be defined as $N_2/(N_2+N_4)$.

Figure 1:
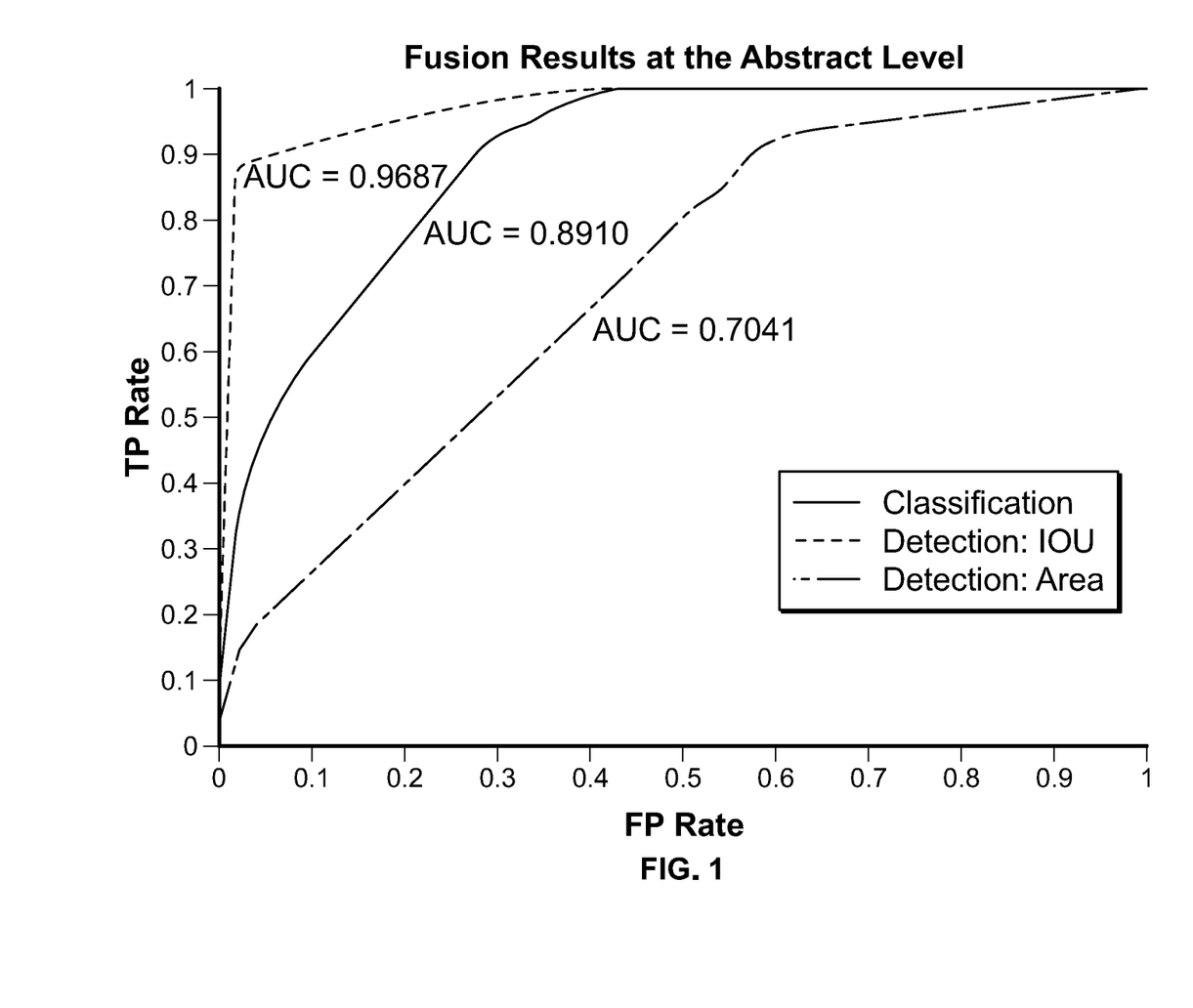
FIG. 1 is a graph illustrating an example output generated by a fusion process in accordance with the present disclosure for detecting image forgery.

FIG. 1 is a graph illustrating an example output generated by a fusion process in accordance with the present disclosure for detecting image forgery, which will now be discussed in greater detail. When making a decision on image forgery, the system can combine the algorithms discussed above and their fused result. The system can employ three approaches to fusion: at the feature level, the output level and the abstract level. Also, the system can use fusion at the decision rule level based on all the algorithms discussed in greater detail above. The system of the present disclosure can utilize the algorithms discussed above, and also can utilize other algorithms that are known in the art. The system can draw a convex hull of the ROC curves altogether, which represents a decision rule based on thresholds of all the algorithms that the system can consider. The resulting curve is as drawn in FIG. 1.

The system of the present disclosure can rely on fully connected neural networks to create a forging classifier and to detect image forgery. To classify images by fusing outputs from the above benchmarked algorithm, the system can include a fusion architecture and also benchmark decision making using neural networks for each individual algorithm. The system can divide a dataset into a training set of 29980 images and test set of 9990 images, over which the networks can be benchmarked.

Figure 2:
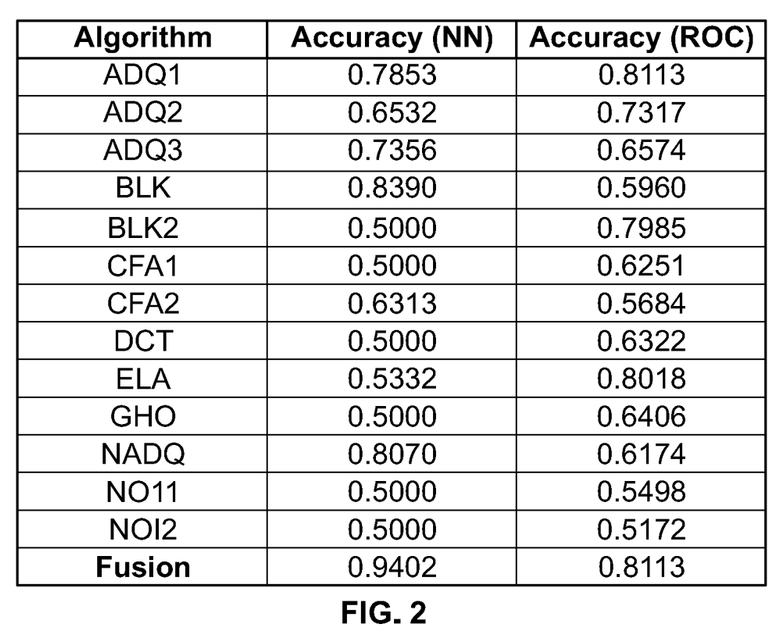
FIG. 2 is a table showing results of the fusion process carried out by the system for detecting image forgery.

The system can train a separate 4-layer fully connected network for the algorithms discussed above and others that can exist in the art. The input to the individual networks can be taken as the flattened output of the algorithms (scaled to dimension 75×90 for certain algorithms, and for others, scaled to a size of 75×90 or 38×45). The intermediate layers are activated using a softmax activation function while the ultimate layer is activated using a sigmoid function. Mean-squared error and Adam optimizer can be taken as the loss function and optimizer respectively. The system can then build an end-to-end fusion architecture by extending the networks described above. The system can connect the penultimate layers of the individual networks to a merge layer which can concatenate the outputs of all the algorithms for detecting image forgery. The system can then further connect a fully connected layer activated by the softmax function and the last layer can be activated using the sigmoid function. The results of the fusion process are shown in FIG. 2.

Figure 3:
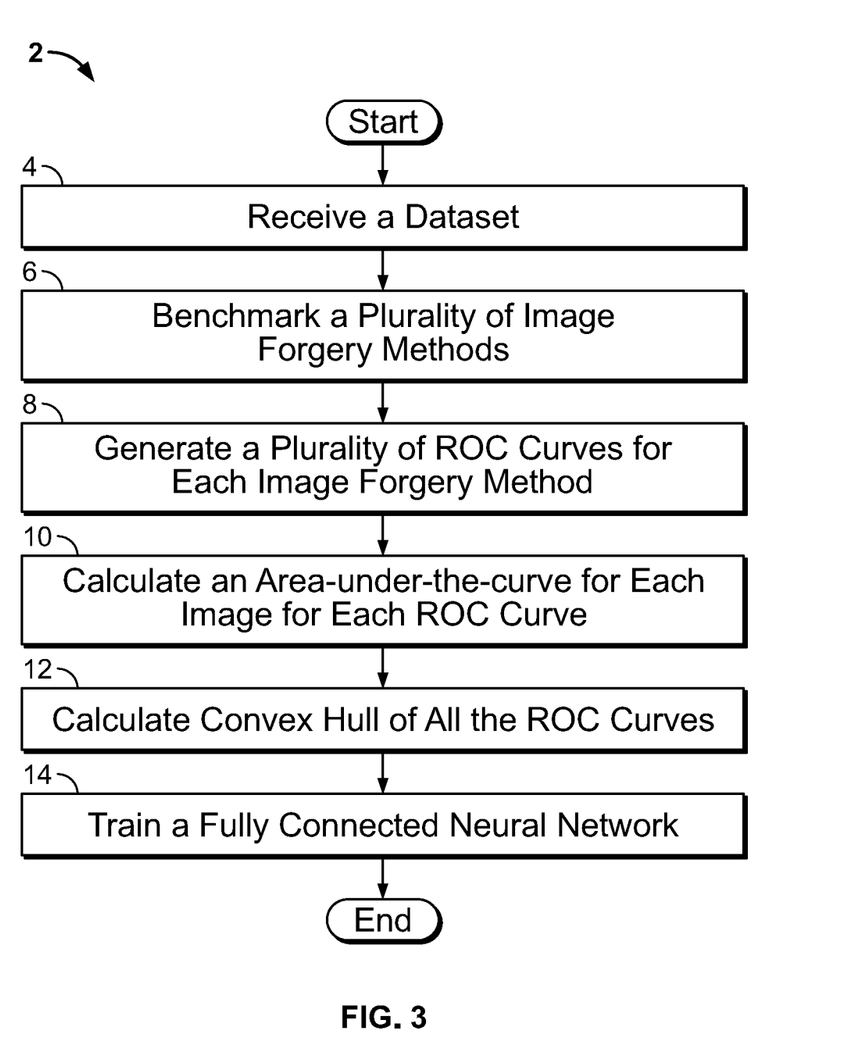
FIG. 3 is a flowchart illustrating processing steps carried out by the system for detecting image forgery.

FIG. 3 is a flowchart illustrating processing steps 2 carried out by the system for detecting image forgery. In step 4, the system can receive a dataset having a plurality of images. The dataset can be consistent with datasets as described in greater detail above. In step 6, the system can benchmark a plurality of image forgery algorithms or methods as was discussed in greater detail above. In step 8, the system can generate a plurality of ROC curves for each of the plurality of image forgery algorithms or methods, as was discussed in greater detail above. In step 10, the system can calculate an area-under-the-curve for each of the plurality of ROC curves, as also was discussed in greater detail above. In step 12, the system can calculate a convex hull of all the ROC curves, as was explained in greater detail above. In step 14, the system can train a fully connected neural network for image forgery detection and classification as was explained in greater detail above. The system can then receive an image as input to the neural network, which can determine whether the image has been manipulated and area in which the manipulation has occurred as discussed in greater detail above.

Figure 4:
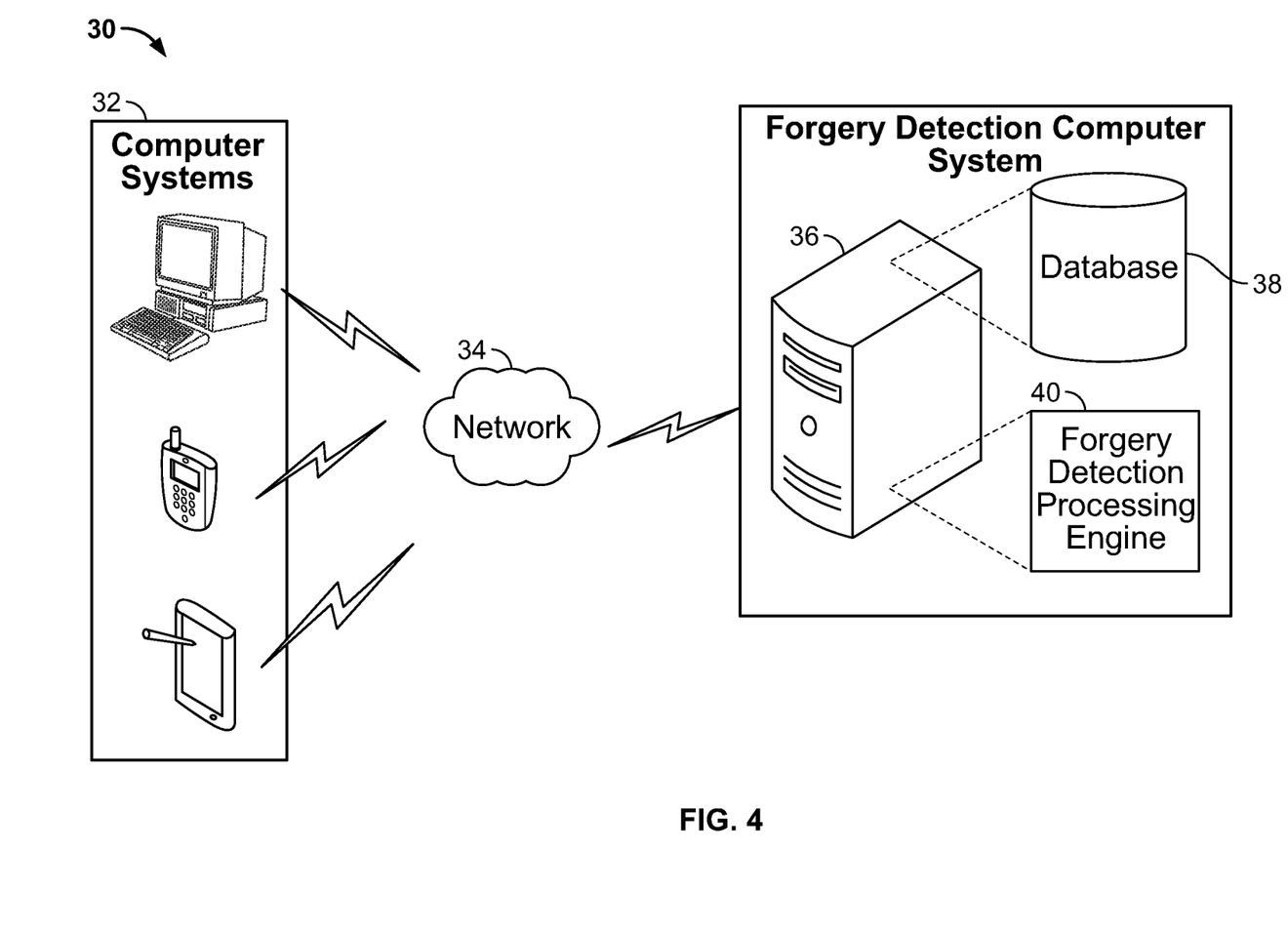
FIG. 4 is a diagram of an embodiment of a system of the present disclosure.

FIG. 4 is a system diagram of an embodiment of a system 30 of the present disclosure. The system 30 can include at least one computer system 32. The computer system 32 can receive or generate a dataset. The computer system 32 can be a personal computer or a smartphone, tables, laptop, or other similar device. The computer system 32 could be any suitable computer server (e.g., a server with an INTEL microprocessor, multiple processors, multiple processing cores) running any suitable operating system (e.g., Windows by Microsoft, Linux, etc.). The computer system 32 can also receive wireless or remotely the dataset having the computer images to be processed by the image forgery process of the present disclosure. The computer system 32 can communicate over a network 34 such as the Internet. Network communication could be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, emails, electronic data interchange (EDI) messages, extensible markup language (XML) messages, file transfer protocol (FTP) file transfers, etc.), or any other suitable wired or wireless electronic communications format. The computer system 32 can communicate with a image forgery detection computer system 36 having a database 38 for storing a the images to be processed and for storing data for training the neural network as described above. Moreover, the image forgery detection computer system 36 can include a memory and processor for executing computer instructions. In particular, the image forgery detection computer system 36 can include a forgery detection processing engine 40 for executing the processing steps described in greater above for performing image forgery detection on images.

Figure 5:
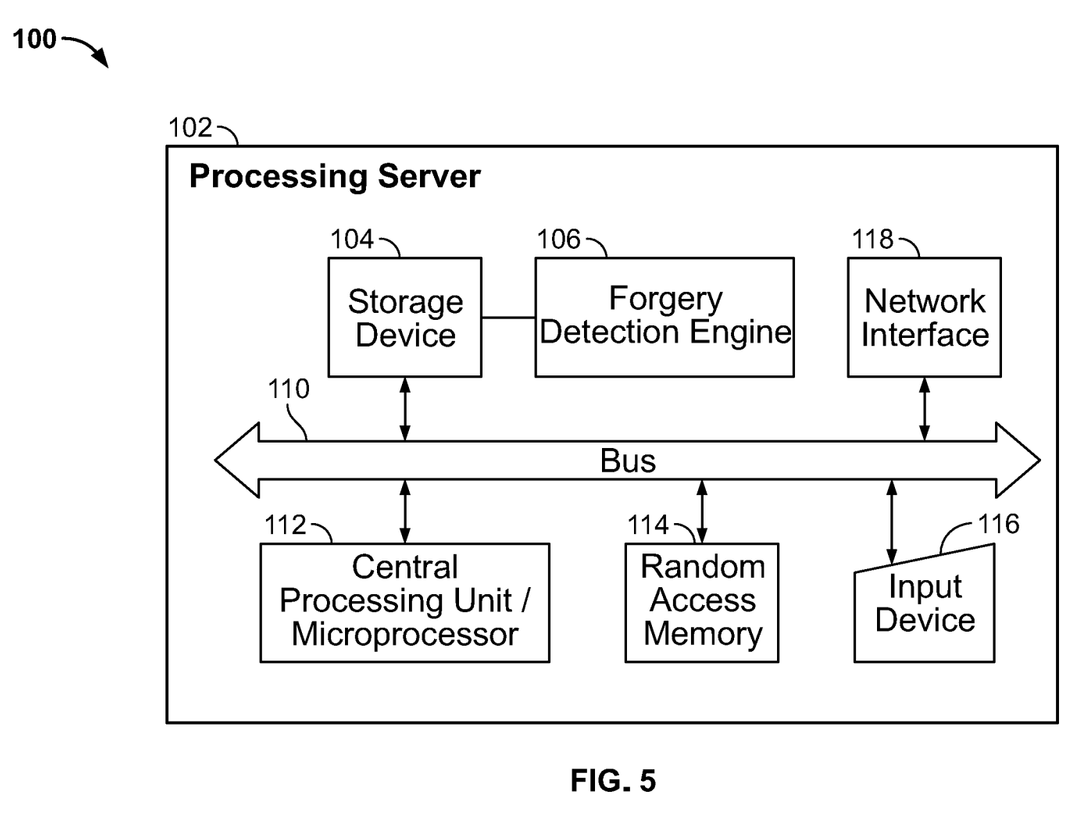
FIG. 5 is a diagram showing hardware and software components of a computer system on which the system of the present disclosure could be implemented.

FIG. 5 is a diagram showing hardware and software components of a computer system 100 on which the system of the present disclosure could be implemented. The system 100 comprises a processing server 102 which could include a storage device 104, a network interface 108, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The server 102 could be a networked computer system, a personal computer, a smart phone, tablet computer etc. It is noted that the server 102 need not be a networked server, and indeed, could be a stand-alone computer system. The functionality provided by the present disclosure could be provided by an forgery detection program/engine 106, which could be embodied as computer-readable program code stored on the storage device 104 and executed by the CPU 112 using any suitable, high or low level computing language, such as Python, Java, C, C++, C#, .NET, MATLAB, etc. The network interface 108 could include an Ethernet network interface device, a wireless network interface device, or any other suitable device which permits the server 102 to communicate via the network. The CPU 112 could include any suitable single- or multiple-core microprocessor of any suitable architecture that is capable of implementing and running the forgery detection program 106 (e.g., Intel processor). The random access memory 114 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is intended to be protected by Letters Patent is set forth in the following claims.

What is claimed is:

1. A method for detecting image forgery comprising the steps of:
    receiving a dataset having a plurality of authentic images and a plurality of manipulated images;
    benchmarking a plurality of image forgery algorithms using the dataset;
    generating a plurality of receiver operating characteristic (ROC) curves for each of the plurality of image forgery algorithms;
    calculating a plurality of area under curve classification metrics for classifying that an image has been tampered and detection metrics for detecting which part of the image has been tampered for each of the plurality of ROC curves; and
    training a neural network to generate a forging classifier and to detect image forgery based on fusing each of the plurality of area under curve classification metrics and the detection metrics for each of the plurality of ROC curves, wherein the neural network is trained using outputs of plurality of image forgery algorithms and layers of the neural network are connected to form a merge layer that concatenates the outputs of the plurality of image forgery algorithms for detecting image forgery.

2. The method of claim 1, further comprising calculating a convex hull based on the plurality of ROC curves.

3. The method of claim 2, further comprising the step of training the neural network based on the convex hull.

4. The method of claim 1, wherein the plurality of image forgery algorithms are selected from at least one of a double quantization algorithm, an error analysis algorithm, a block artifact grid algorithm, a color filter array algorithm, a purple fringing aberration algorithm, or a local noise algorithm.

5. The method of claim 1, wherein the plurality of manipulated images include images that are manipulated by image splicing.

6. The method of claim 1, wherein the plurality of manipulated images include images that are manipulated by copy-moving.

7. The method of claim 1, wherein the plurality of manipulated images include images that are manipulated by rendering.

8. The method of claim 1, wherein the plurality of manipulated images include images that are manipulated by steganography.

9. The method of claim 1, wherein the dataset includes at least one JPEG image.

10. The method of claim 1, wherein the dataset includes at least one TIFF image.

11. The method of claim 1, further comprising generating an output likelihood map representing a likelihood of whether each of a plurality of pixels have been tampered.

12. The method of claim 11, further comprising introducing a threshold value to distinguish between a tampered pixel and an untampered pixel.

13. A non-transitory computer-readable medium having computer-readable instructions stored thereon which, when executed by a computer system, cause the computer system to perform the steps of:
    receiving a dataset having a plurality of authentic images and a plurality of manipulated images;
    benchmarking a plurality of image forgery algorithms using the dataset;

generating a plurality of receiver operating characteristic (ROC) curves for each of the plurality of image forgery algorithms;

calculating a plurality of area under curve classification metrics for classifying that an image has been tampered and detection metrics for detecting which part of the image has been tampered for each of the plurality of ROC curves; and training a neural network to generate a forging classifier and to detect image forgery based on fusing each of the plurality of area under curve classification metrics and detection metrics for each of the plurality of ROC curves, wherein the neural network is trained using outputs of plurality of image forgery algorithms and layers of the neural network are connected to form a merge layer that concatenates the outputs of the plurality of image forgery algorithms for detecting image forgery.

14. The non-transitory computer-readable medium of claim 13, further comprising the step of calculating a convex hull based on the plurality of ROC curves.

15. The non-transitory computer-readable medium of claim 14, further comprising the step of training the neural network based on the convex hull.

16. The non-transitory computer-readable medium of claim 13, wherein the plurality of image forgery algorithms are selected from at least one of a double quantization algorithm, an error analysis algorithm, a block artifact grid algorithm, a color filter array algorithm, a purple fringing aberration algorithm, or a local noise algorithm.

17. The non-transitory computer-readable medium of claim 13, wherein the plurality of manipulated images include images that are manipulated by image splicing.

18. The non-transitory computer-readable medium of claim 13, wherein the plurality of manipulated images include images that are manipulated by copy-moving.

19. The non-transitory computer-readable medium of claim 13, wherein the plurality of manipulated images include images that are manipulated by rendering.

20. The non-transitory computer-readable medium of claim 13, wherein the plurality of manipulated images include images that are manipulated by steganography.

21. The non-transitory computer-readable medium of claim 13, wherein the dataset includes at least one JPEG image.

22. The non-transitory computer-readable medium of claim 13, wherein the dataset includes at least one TIFF image.

23. The non-transitory computer-readable medium of claim 13, further comprising—generating an output likelihood map representing a likelihood of whether each of a plurality of pixels have been tampered.

24. The non-transitory computer-readable medium of claim 23, further comprising introducing a threshold value to distinguish between a tampered pixel and an untampered pixel.

25. A system for detecting image forgery, comprising:
a database including a dataset having a plurality of authentic images and a plurality of manipulated images; and
a computer system in communication with the database, wherein the computer system:
benchmarks a plurality of image forgery algorithms using the dataset;
generates a plurality of receiver operating characteristic (ROC) curves for each of the plurality of image forgery algorithms;
calculates a plurality of area under curve classification metrics for classifying that an image has been tampered and detection metrics for detecting which part of the image has been tampered for each of the plurality of ROC curves; and
trains a neural network to generate a forging classifier and to detect image forgery based on fusing each of the plurality of area under curve classification metrics and detection metrics for each of the plurality of ROC curves, wherein the neural network is trained using outputs of plurality of image forgery algorithms and layers of the neural network are connected to form a merge layer that concatenates the outputs of the plurality of image forgery algorithms for detecting image forgery.

26. The system of claim 25, wherein the computer system calculates a convex hull based on the plurality of ROC curves.

27. The system of claim 26, wherein the computer system trains the neural network based on the convex hull.

28. The system of claim 25, wherein the plurality of image forgery algorithms are selected from at least one of a double quantization algorithm, an error analysis algorithm, a block artifact grid algorithm, a color filter array algorithm, a purple fringing aberration algorithm, or a local noise algorithm.

29. The system of claim 25, wherein the plurality of manipulated images include images that are manipulated by image splicing.

30. The system of claim 25, wherein the plurality of manipulated images include images that are manipulated by copy-moving.

31. The system of claim 25, wherein the plurality of manipulated images include images that are manipulated by rendering.

32. The system of claim 25, wherein the plurality of manipulated images include images that are manipulated by steganography.

33. The system of claim 25, wherein the computer system generates an output likelihood map representing a likelihood of whether each of a plurality of pixels have been tampered.

34. The system of claim 33, wherein the system calculates a threshold value to distinguish between a tampered pixel and an untampered pixel.

* * * * *

UNITED STATES PATENT AND TRADEMARK OFFICE
CERTIFICATE OF CORRECTION

PATENT NO. : 11,410,414 B2
APPLICATION NO. : 15/729413
DATED : August 9, 2022
INVENTOR(S) : Ghosh et al.

It is certified that error appears in the above-identified patent and that said Letters Patent is hereby corrected as shown below:

On the Title Page

On page 3, Item (56) under the References Cited Other Publications Column, the second reference down the first column, the word "Pitfail" should be deleted and replaced with the word "Pittfall"

Signed and Sealed this
Seventh Day of March, 2023

Katherine Kelly Vidal
*Director of the United States Patent and Trademark Office*